Dec. 19, 1950     L. KNIEL     2,534,274
FRACTIONAL DISTILLATION
Filed Jan. 28, 1947
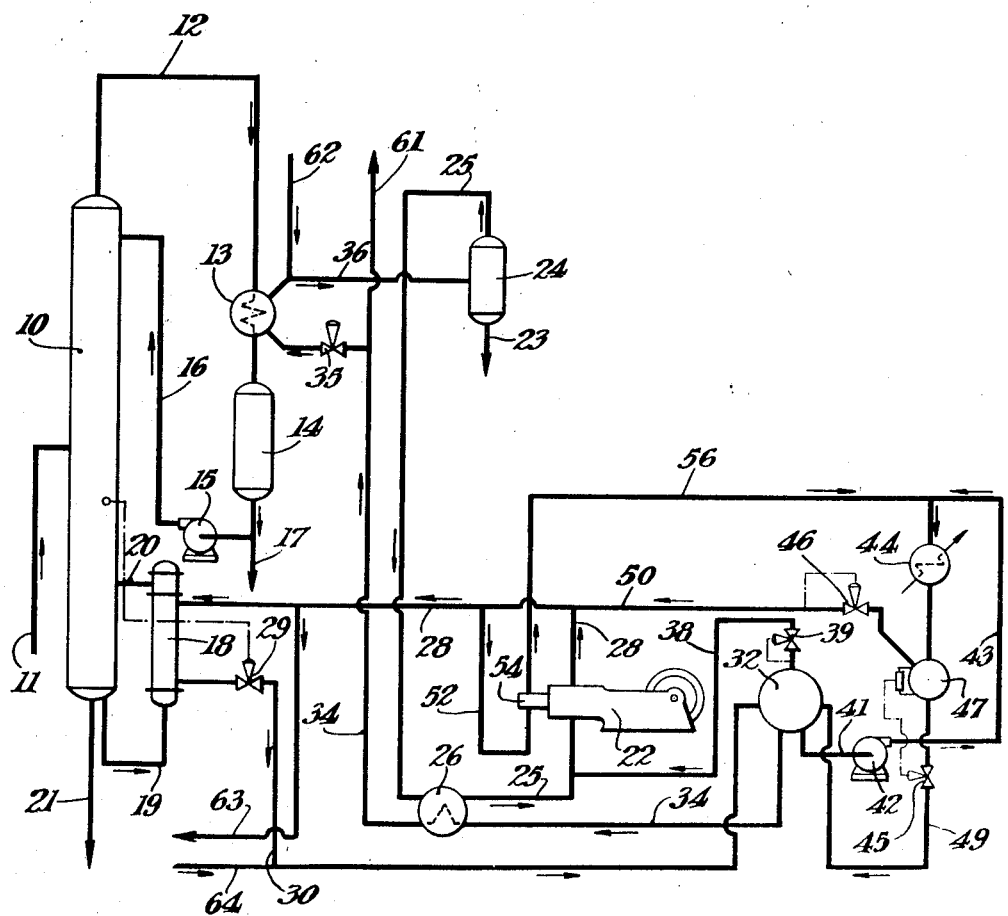
INVENTOR.
Ludwig Kniel
BY Nathaniel Ely
ATTORNEY Patented Dec. 19, 1950

2,534,274

UNITED STATES PATENT OFFICE 2,534,274

FRACTIONAL DISTILLATION

Ludwig Kniel, Scarsdale, N. Y., assignor to The Lummus Company, New York, N. Y., a corporation of Delaware Application January 28, 1947, Serial No. 724,857

10 Claims. (Cl. 62—2)

This invention relates to fractional distillation and more particularly to methods and apparatus for the separation of mixtures of narrow boiling range or mixtures of normally gaseous hydrocarbons which require refrigeration for their resolution by fractional distillation.

Mixtures of narrow boiling range are usually separated by distillation under either high pressure using cooling water to condense the tower overhead or low pressure using refrigeration to condense the overhead and in both cases, using steam to supply the heat requirements at the base of the column. Neither of these methods, as applied to mixtures of low boiling normally gaseous hydrocarbons, is satisfactory economically, however. High pressure distillation has the obvious disadvantage of requiring expensive, pressurized equipment. In addition, due to the low relative volatilities of the normally gaseous hydrocarbons at high pressures, a large number of plates are needed in the distillation tower and thus the tower alone is very expensive.

Low pressure distillation, on the other hand, is more economical since low pressure equipment may be used throughout the installation. In addition, since the relative volatilities of the normally gaseous hydrocarbons are high, a column of only a relatively small number of plates is required. However, there are several disadvantages in a low pressure system of this type. For instance, as mentioned above, refrigeration is required to condense the volatile, low boiling point hydrocarbons in the reflux condenser. Also, if the composition of the feed to the tower is changed so that the heat requirement at the bottom of the tower is increased substantially, there is a strong probability that ice will form in the bottom of the reboiler tube bundle causing subsequent damage to the reboiler equipment.

A modification of this low pressure method has been suggested for the separation of mixtures of normally gaseous hydrocarbons of narrow boiling range and this modification forms the basis of my invention. In the separation of such mixtures the top and bottom temperatures in the distillation column are not very different and therefore, assuming the feed entering at its boiling point the greater proportion of the heat added in the reboiler at the base of the tower must be removed in the reflux condenser at the top of the tower. With the high reflux ratios required to effect the separation of such mixtures, the heat removed in the reflux condenser, although less than the reboiler heat, tends to approach the latter in quantity. If, on the other hand, the feed to the tower is superheated, the heat removed overhead in the reflux condenser may be greater than that entering the tower at the reboiler. In either case, the difference between the heat removed by the reflux condenser and that required at the reboiler is mainly a difference in the temperature level of each since, in the distillation of mixtures of this type, the difference in amount of heat removed at the reflux condenser and that supplied to the reboiler is small.

It will be apparent, therefore, that the heat recovered in the reflux condenser may be used to supply heat at the reboiler. To do this, it is only necessary to raise the temperature level of the heat recovered at the reflux condenser to a level higher than that required to heat the reboiler. This may be readily done by means of a refrigeration system wherein the heat removed at one temperature level is transferred to a higher temperature level by the work of compression done on the heat transfer medium or refrigerant. Such a refrigeration system may be so combined with a distillation system that the reboiler becomes the refrigerant condenser and the reflux condenser becomes the refrigerant evaporator. Considered thus, it becomes apparent that a fractionating system can be operated at low pressures without the use of outside utilities, that is, without outside steam to the reboiler and without cooling water to the reflux condenser. The refrigeration system may be so designed that all or a part of the heat removed overhead in the distillation column will be delivered to the reboiler at a higher temperature.

A readily apparent defect in such a theoretically advantageous scheme is that, as described above, the refrigeration system will be operable only under that set of conditions for which it is designed. For instance, any change in amount or composition of charge to the tower will effect the tower heat balance and will, therefore, necessitate a corresponding change in the operation of the refrigeration system. These changes may be made by either adding or taking heat from the refrigeration system at some suitable point in the system.

It is, therefore, one of the principal objects of my invention to provide in a nearly balanced refrigerated fractionation system for the separation of close boiling mixtures, of the nature above referred to, control means for adding supplementary heat or removing surplus heat whereby the flexibility of the system will meet the normal fluctuations in operating conditions.

More particularly it is an object of my invention to eliminate substantially the outside utilities of steam and cooling water in the fractionating of close boiling mixtures of the nature above referred to, using simplified control means for adjusting the system to changing conditions.

Further objects and advantages of my invention will appear from the following description of a preferred form of embodiment thereof taken in conjunction with the attached drawing which is a simplified flow diagram of a refrigerated fractionation system.

Referring to the attached flow sheet, 10 is a fractionating tower such as might be used for the separation of a multi-component mixture of normally gaseous hydrocarbons of a narrow boiling range. Such a mixture may be introduced to column 10 through line 11. The overhead vapors are removed through line 12 and pass through overhead condenser 13, the reflux condensate being stored in drum 14. Part of such condensate may be returned by pump 15 through line 16 as reflux to the tower 10 and the remainder may be withdrawn as product through line 17.

The material in the lower part of tower 10 is heated in the usual way as by being removed through line 19, passed through reboiler 18 and returned to the column through line 20. A bottoms product may be removed through line 21.

The refrigeration system used in conjunction with this fractionating tower and described in detail below uses as the heat transfer medium any of the typical refrigerants, such as the normally gaseous hydrocarbons as, for instance, propane, propylene, ethane or ethylene, or mixtures of the hydrocarbons or such common refrigerants as sulfur dioxide, ammonia or carbon dioxide. The particular refrigerant used is dependent on the composition of the charge to the tower and the operating conditions in the tower.

In operation of the refrigeration system the liquid refrigerant in the accumulator 32 is withdrawn through line 34 and, flowing under its own pressure, is passed through heat exchanger 26 where it is cooled by the refrigerant vapors passing from the reflux condenser system in line 25. From the heat exchanger 26, the liquid refrigerant then passes to the reflux condenser 13 through expansion valve 35. This valve admits the proper amount of refrigerant to the condenser 13 wherein the heat is removed from the tower overhead by evaporation of the liquid refrigerant in the reflux condenser.

From the condenser 13 the vapors are passed through line 36 to the knockout drum 24 where any entrained liquid refrigerant will separate from the vapors. The accumulated liquid in drum 24 may be withdrawn from time to time by way of line 23 and may be put back in the system as desired, preferably at the accumulator 32. The vapors flow from drum 24 by way of line 25 passing through heat exchanger 26 countercurrent to the liquid refrigerant in line 34 and finally to compressor 22.

Compressor 22 operating at a constant speed compresses the refrigerant vapors and, as a consequence, increases the temperature of these vapors to a level above that of the reboiled hydrocarbons in the reboiler 18. Operating at a constant speed this compressor is also used in conjunction with the refrigeration control system to balance the heat load at the reboiler 18 and reflux condenser 13. As indicated in the flow diagram, it is provided with a low pressure stage and a high pressure stage 54. The vapors entering the low pressure stage are a combination of the vapors passing from the reflux condenser through line 25 and the small amount of excess vapors passing from the accumulator 32 by way of line 38. From the compressor 22, the vapors are passed to line 50 and thence to the reboiler 18 by way of line 28. A part of these vapors are by-passed through line 52 and the high pressure stage 54 of compressor 22. The vapors passing through line 28 are condensed in reboiler 18 and the resulting liquid withdrawn through valve 29 and line 30 thereafter flowing back to the accumulator 32 for further recycle in the refrigeration system.

Valve 29, as indicated, is a temperature controlled valve maintaining the temperature in tower 10 at a substantially constant value by controlling the liquid refrigerant level in reboiler 18 and thus the amount of heat exchange surface exposed to the condensing vapors. It is apparent, however, that this valve may be controlled by many other means as, for instance, by the pressure in tower 10.

So far, I have described a simple refrigeration system for a distillation tower wherein the heat dissipated in the reflux condenser, is carried by the refrigerant to the reboiler. Between these two points work is done on the refrigerant vapors by compressor 22 whereby the vapors are raised to such a pressure that they may be condensed at the temperature in the reboiler thereby supplying the necessary heat at the reboiler. This refrigeration system is operable, however, for only a certain set of tower operating conditions, and therefore, suitable control means must be provided for such varying conditions as will be encountered in any practical installation. For instance, if the composition of the feed to the tower 10 is changed over only a small range, a situation not uncommon in plant operations, the refrigeration system will not meet these changed conditions without modification, and as heretofore mentioned, it is an object of my invention to meet these changing conditions by a suitable control system.

In general, there are three different operating conditions that must be met by the control system. In the first, the heat supplied in the compressed vapors from the low pressure stage of the compressor will be equal to that required by the reboiler 18 of column 10. In the second, the heat supplied in the compressed vapors will be greater than that required by reboiler 18 and in the third case, the heat supplied in the compressed vapors will be less than that required by reboiler 18. If we designate the heat available in the compressed vapors entering the reboiler as $H_1$, the heat required by reboiler 18 as $H_2$, the heat to be given up by the overhead vapors in condenser 13 as $H_3$, and the heat removed from the vapors by the refrigerant entering condenser 13 as $H_4$, then the three conditions may be designated as follows:

Since in any case the heat given up by the overhead vapors from column 10 will be equal to the heat absorbed by the refrigerant in the reflux condenser, $H_3$ will be equal to $H_4$. Therefore, in the first of the above three conditions $H_1-H_4$ is equal to $H_2-H_4$, in the second, $H_1-H_4$ is greater than $H_2-H_4$ and in the third, $H_1-H_4$ is less than $H_2-H_4$.

For control of the refrigeration system under these varying conditions I have provided pump 42, condenser 44, pressure controlled valve 46 and trim or flash tank 47 with its associated liquid level control valve 45. These, combined with the temperature actuated valve 29 and high pressure stage 54 of compressor 22, form a unique control system, the operation of which is described in detail below.

In the refrigeration system, as heretofore mentioned, the high pressure compressor 54 circulates a constant amount of vapors from line 52 through line 56 since the inlet pressure to the compressor is substantially constant. Condenser 44 is supplied with cooling water at all times and pump 42, running continuously, circulates a portion of the liquid refrigerant from accumulator 32 over condenser 44 and tank 47 back to tank 32. Although referred to in this disclosure as a condenser, it will be apparent from the description below that 44 operates broadly as a heat exchanger under the varying conditions of operation of the control system.

Assuming now the first of the three conditions in which $H_1-H_4$ is equal to $H_2-H_4$. In this case valve 46 will be partially open. A portion of the vapors in line 50 are by-passed through line 52 to the high pressure stage 54, thence to line 56 and finally, into condenser 44. Under the condition of $H_1-H_4$ being equal to $H_2-H_4$ the pressure in line 50, which determines the setting of valve 46 and indirectly the pressure in condenser 44, is such that the pressure in condenser 44 is below that required to condense the vapors passing to condenser 44 from line 56 at the temperature of the cooling water in the condenser. All of these vapors will, therefore, pass back to line 50 from the trim tank 47. Thus, a constant amount of the vapors from the low pressure side of compressor 22 is merely recycled through line 52, compressor 54, line 56, condenser 44, tank 47 and finally back to line 50. The liquid refrigerant pumped from the accumulator 32 by pump 42 through line 43, condenser 44 and into tank 47, since it will not vaporize at the temperature and pressure of condenser 44, will actuate the liquid level control thereby opening valve 45 so that in the first case, this liquid from the accumulator is merely pumped in a closed cycle independent of the fractionating system.

If now $H_1-H_4$ is greater than $H_2-H_4$, the second case mentioned above, a different set of conditions will obtain. In this case, since too much heat is being passed to the reboiler the temperature in the bottom of tower 10 will rise causing temperature actuated valve 29 to close. The condensate level in the reboiler will rise and thus the pressure in line 28 will increase. This increase will be reflected back to line 50 causing the valve 46 to close to a degree proportional to this increase in pressure. Since, as mentioned above, vapors are being continuously passed through line 56 and since valve 46 has partially closed, the pressure of the vapors over the liquid in tank 47 will increase and this increase will be reflected back into the condenser 44. This increased pressure in condenser 44 is sufficient to cause a condensation of the vapors in condenser 44 at the temperature of the cooling water, thereby decreasing the amount of vapors available for recycling to line 50 from the trim tank 47 and consequently, the amount of heat available at the reboiler 18. The condensed vapors from condenser 44 combining with the liquid from line 43 will be passed back to accumulator 32 through line 49 and valve 45 from trim tank 47.

When $H_1-H_4$ is less than $H_2-H_4$ more heat is required at the reboiler to effect the desired separation in tower 10. In this, the third case, the temperature in the bottom of tower 10 will drop thereby opening the temperature actuated valve 29 to expose more tube surface in the reboiler 18. Although this raises the temperature in tower 10 it causes a decrease in pressure in line 28 which is reflected back to line 50 and valve 46. The valve 46 now opens to a degree proportional to the decrease in pressure in line 50 thereby allowing more vapors to flow in line 50.

Since in the first case described above, all the vapors in line 56 were being recycled through line 50, the excess vapors required to supply additional heat at the reboiler must come from some other source. This other source is the liquid being pumped from accumulator 32 by pump 42. Since in this third case the pressure has dropped in line 50 the pressure will drop in tank 47 and thus in condenser 44. The pressure in the condenser 44 rapidly falls below that pressure required to keep the refrigerant in line 43 from vaporizing at the temperature in condenser 44. The vapors thus formed by the vaporization of the liquid in line 43 are combined with the vapors from line 56 and passed back to the reboiler through valve 46 and line 50 to supply the excess heat required in reboiler 18.

Under any of these conditions of operation, the pressure of the liquid refrigerant in the accumulator 32 is maintained substantially constant by means of the pressure controlled valve 39 in line 38. With an increase in pressure in the accumulator 32, valve 39 will open to pass excess vapors through line 38 to the low pressure stage of compressor 22.

It should be noted that in this refrigeration system an excess or deficiency in the heat requirements of the tower is made up by a corresponding decrease or increase in the amount of the vapors supplied to the reboiler 18.

Since a uniform product is desired at line 17 under conditions of varying concentration and amount of charge to the tower 10, it is necessary to have suitable control means for maintaining a constant temperature in the reflux circuit at the top of the tower. I have not shown such means since they are well known to those skilled in the art of distillation. For instance, it is common practice to control the amount of coolant to the reflux condenser to maintain the purity of product by a temperature controlled valve in line 36 controlling the amount of refrigerant entering the reflux condenser 13.

It should also be noted that by a suitable change in the size of the compressor this refrigeration system may be used in conjunction with several such towers as tower 10. For instance, a part of the liquid refrigerant in line 34 may be passed through line 61 to one or a series of expansion valves similar to valve 35 each one being associated with its reflux condenser and distillation tower. The vapors having passed through the separate reflux condenser would then be passed back to line 36 by way of line 62.

In the same way heat for the reboiler of several such distillation towers may be supplied by this one refrigeration system. The hot refrigerant vapors may be passed through line 63 to a number of reboilers similar to reboiler 18 each associated with its distillation tower. The partially condensed vapors leaving these separate reboilers would be then collected and returned to the refrigeration control system by way of line 64. As above, each reboiler would have a temperature controlled valve similar to valve 29 to control the level of the condensed refrigerant in the reboiler. Operating as described above it would, of course, be necessary to change the size of the component parts of the refrigeration control system to provide for the increased quantity of refrigerant being passed through the control system.

This combined refrigeration distillation system has, as heretofore mentioned, a particular advantage in that the outside utilities of steam and water are substantially eliminated. Only a small amount of fuel gas is necessary to run the compressor and an insignificant amount of cooling water is required for the heat exchanger 44. In addition, with the present system the cost of the distillation tower will be substantially reduced as it will operate at a much reduced pressure and at a lower reflux ratio. For example, if the separation between ethylene and ethane is considered at a top tower temperature of minus 40° F., it is possible to reduce the tower pressure from the 400 pounds per square inch gauge necessary in the conventional system to 170 pounds per square inch gauge and to reduce the reflux ratio by approximately 35%. The cost of the fractionating system, as a whole, could then be materially reduced.

While I have shown and described a preferred form of embodiment of my invention, I am aware that modifications may be made thereto and I, therefore, desire a broad interpretation of my invention within the scope of the disclosures and the following claims.

I claim:

1. In the operation of a fractionating column wherein different temperatures are maintained in separated zones within said column by removing heat from an overhead fraction and adding heat to a liquid in the bottom of the column, the steps of condensing substantially all of a stream of a gaseous refrigerant by indirect heat exchange with the liquid in the bottom of the column, vaporizing said condensed refrigerant in indirect heat exchange with the overhead fraction; compressing said vaporized refrigerant; returning said compressed refrigerant to said first heat exchange step; and vaporizing a part of said condensed refrigerant in a heat exchange zone independent of said fractionating column and external of the overhead vaporizer when the heat given up by the condensing refrigerant at the bottom of the column is less than that required by the liquid in the bottom of the column and returning said vapors to the compressed refrigerant passing to heat exchange with the bottoms liquid.

2. In the operation of a fractionating column wherein different temperatures are maintained in separated zones within said column by removing heat from an overhead fraction and adding heat to a liquid in the bottom of the column, the steps of condensing substantially all of a stream of a gaseous refrigerant by indirect heat exchange with the liquid in the bottom of the column; vaporizing said condensed refrigerant in indirect heat exchange with the overhead fraction; compressing said vaporized refrigerant; returning a major part of said compressed refrigerant to said first heat exchange step; further compressing the remaining part of said compressed refrigerant; and passing said recompressed refrigerant with a part of said condensed refrigerant to a heat exchange zone independent of said fractionating column.

3. The method of operating a fractionating column as claimed in claim 2 wherein a part of said recompressed refrigerant is condensed when the heat given up by the condensing refrigerant at the bottom of the column is greater than that required by the liquid in the bottom of the column.

4. The method of operating a fractionating column as claimed in claim 2 wherein a part of said recompressed refrigerant is vaporized, said vapors being thereafter passed to said first heat exchange step when the heat given up by the condensing refrigerant at the bottom of the column is less than that required by the liquid in the bottom of the column.

5. In the operation of a fractionating column for the separation of close boiling components of a mixture of normally gaseous hydrocarbons requiring the maintenance of different but close temperatures in separated zones within said column by removing heat from an overhead fraction and adding heat to a liquid in the bottom of the column, the steps of condensing all of a stream of a gaseous refrigerant by indirect heat exchange with the liquid in the bottom of the column; vaporizing said condensed refrigerant in indirect heat exchange with the overhead fraction; passing said vaporized refrigerant in indirect heat exchange with said condensed refrigerant; compressing said vaporized refrigerant; returning a part of the compressed refrigerant to said first heat exchange step; recompressing the remaining part of said compressed refrigerant, and passing said recompressed refrigerant with a part of said condensed refrigerant to a heat exchange zone independent of said fractionating column and external of the circuit including the first heat exchange step.

6. In a method of separating a mixture of normally gaseous hydrocarbons of narrow boiling range in a fractionating column whereby said mixture is separated into a vaporous fraction as overhead and a liquid fraction as bottoms in said column, the steps of condensing a normally gaseous refrigerant in indirect heat exchange with the liquid fraction; passing said condensed refrigerant to a refrigerant accumulation zone; vaporizing a part of said condensed refrigerant by indirect heat exchange with said vaporous fraction; passing said vaporized refrigerant in indirect heat exchange with said condensed refrigerant; compressing said vaporized refrigerant; returning a part of the compressed refrigerant to said first heat exchange step; recompressing the remainder of the compressed refrigerant; passing said recompressed refrigerant with a part of said condensed refrigerant to a heat exchange zone independent of said fractionating column; adjusting the heat content of said refrigerant in said heat exchange zone; passing any condensed refrigerant from said heat exchange zone to said refrigerant accumulation zone, and passing any uncondensed refrigerant to said first heat exchange step whereby the heat supplied to said liquid fraction as bottoms in said column may be controlled.

7. In a fractionating system for the separation of a mixture of normally gaseous hydrocarbons having a narrow boiling range wherein said mixture is separated into a gaseous fraction and a liquid fraction, said gaseous fraction being passed to a reflux condenser and said liquid fraction to a reboiler, the combination of a refrigeration system utilizing a normally gaseous refrigerant and including a compressor, means to pass a part of said refrigerant from said compressor in indirect heat exchange relation with the liquid in said reboiler whereby said refrigerant is condensed, an accumulator for said condensed refrigerant, means to pass said condensed refrigerant from said accumulator at a reduced pressure in indirect heat exchange relation with said gaseous fraction in said reflux condenser whereby the condensed refrigerant is vaporized, means to pass said vaporized refrigerant back to said compressor and means to balance the heat required by the reboiler and the heat given up by the condensing refrigerant in the reboiler, said means including a secondary compressor, a refrigerant pump and a condenser therebetween having means to adjust the heat content of said refrigerant in said condenser, a trim tank on the output side of said condenser, and a pressure controlled valve which on pressure change in said reboiler acts to control the amount of refrigerant vapors flowing from said trim tank to said reboiler and means to pass condensed refrigerant from said trim tank back to said accumulator.

8. In the operation of a fractionating column in which heat is constantly added at the lower part and a proportional amount of heat is constantly removed at the upper part, and wherein different temperatures are maintained in the separated zones within said column, the steps of condensing substantially all of a stream of a gaseous refrigerant by indirect heat exchange with a liquid in the bottom of the column, forwarding said refrigerant condensate to an accumulator, vaporizing and expanding condensed refrigerant from said accumulator in indirect heat exchange with a gaseous overhead fraction, compressing said vaporized refrigerant, returning said compressed refrigerant to said first heat exchange step, passing another portion of said refrigerant through a higher stage of compression, compensating for the difference in the heat requirements at the upper and lower parts of the column by continuously passing a part of the condensed refrigerant from the accumulator and the said higher stage compressed refrigerant vapor through a heat exchange zone independent of said fractionating column, maintaining a substantially constant indirect heat exchange on said heat exchange zone, and varying the pressure on said higher stage compressed vapor in accordance with the temperature in the column to adjust the amount of condensate and vapor, depending on whether more than balanced heat or less than balanced heat is desired.

9. In the operation of a fractionating column as claimed in claim 8, the steps claimed therein in which the pressure on the higher stage compressed vapor is increased to make more condensate.

10. In the operation of a fractionating column as claimed in claim 8 the steps claimed therein in which the pressure on the higher stage compressed vapor is decreased to make more vapors.

LUDWIG KNIEL.

REFERENCES CITED

The following references are of record in the file of this patent:

UNITED STATES PATENTS

| Number | Name | Date |
|---|---|---|
| 1,664,412 | Haynes | Apr. 3, 1928 |
| 2,057,804 | Twomey | Oct. 20, 1936 |
| 2,127,004 | Nelson | Aug. 16, 1938 |
| 2,146,197 | Twomey | Feb. 7, 1939 |
| 2,214,790 | Greenewalt | Sept. 17, 1940 |
| 2,230,219 | Carey | Feb. 4, 1941 |
| 2,284,662 | Kahle | June 2, 1942 |
| 2,408,710 | Van Nuys | Oct. 1, 1946 |
| 2,424,201 | Van Nuys | July 15, 1947 |